BEVERAGE TAPE

Filed April 7, 1967 8 Sheets-Sheet 1

INVENTORS
LLOYD K. RUDD
GEORGE R. SCHOLLHAMER
BY
[signature]
ATTORNEYS

BEVERAGE TAPE

Filed April 7, 1967 8 Sheets-Sheet 2

INVENTORS
LLOYD K. RUDD
GEORGE R. SCHOLLHAMER
BY
ATTORNEYS

INVENTORS
LLOYD K. RUDD
GEORGE R. SCHOLLHAMER
BY [signature]
ATTORNEYS

BEVERAGE TAPE

Filed April 7, 1967 8 Sheets-Sheet 4

INVENTORS
LLOYD K. RUDD
GEORGE R. SCHOLLHAMER
BY Synnestvedt & Lechner
ATTORNEYS

INVENTORS
LLOYD K. RUDD
GEORGE R. SCHOLLHAMER
BY
ATTORNEYS

BEVERAGE TAPE

Filed April 7, 1967 8 Sheets-Sheet 6

INVENTORS
LLOYD K. RUDD
GEORGE R. SCHOLLHAMER
BY [signature]
ATTORNEYS

May 18, 1971 L. K. RUDD ET AL 3,579,350

BEVERAGE TAPE

Filed April 7, 1967 8 Sheets-Sheet 7

INVENTORS
LLOYD K. RUDD
GEORGE R. SCHOLLHAMER
BY Synnestvedt & Lechner
ATTORNEYS

BEVERAGE TAPE

INVENTORS
LLOYD K. RUDD
GEORGE R. SCHOLLHAMER
BY Seymour, Wurzlo Lechner
ATTORNEYS

United States Patent Office 3,579,350

Patented May 18, 1971

3,579,350

BEVERAGE TAPE

Lloyd K. Rudd, Berwyn, and George R. Schollhamer, Philadelphia, Pa., assignors to Rudd-Melikian, Inc., Warminster, Pa.

Filed Apr. 7, 1967, Ser. No. 629,138

Int. Cl. B65b 29/02

U.S. Cl. 99—77.1 4 Claims

ABSTRACT OF THE DISCLOSURE

Beverage tape consisting of a pair of water permeable strips encapsulating within cavities pods of beverage material. The cavities are interconnected by flat web portions and are located within one of the strips so that substantially all of the beverage material is positioned on one side of the web. The pods are of elongated plan shape with its major axis extending transversely to the length of the strips. The pods act to self-position the tape within a brewing machine.

This invention relates to production of beverages, especially to the brewing of beverages from powdered beverage material, for instance, from finely ground or powdered coffee.

It is known to employ a system for this purpose in which the powdered beverage material is packaged in pods carried by a tape strip made of a water permeable material, the pods being spaced from each other along the length of the tape strip. The tape strip is adapted to be utilized in a brewing machine in which the individual pods are sequentially brought into a brewing station, where hot water is forced through the pod, and the resultant beverage delivered from the brewing station into a suitable vessel, such as a cup. A beverage tape or cartridge of the kind described, and also a brewing machine adapted for use with such a beverage tape, are disclosed in the Zimmerman et al. Pat. No. 3,209,676, issued Oct. 5, 1965. Moreover, a method and equipment for producing a beverage tape of the kind referred to are disclosed in the Clauss Pat. No. 3,186,139, issued June 1, 1965.

In the disclosure of said prior patents the beverage tape is provided with generally circular pods of beverage material spaced along the length of the tape and the brewing station of the brewing machine is similarly of circular shape to accommodate the circular pods of the tape. Moreover, in the arrangement of the prior patents the tape is provided with indexing holes and the brewing machine is equipped with indexing pins by means of which each pod is accurately positioned in the brewing station of the brewing machine.

The present invention is concerned with a beverage brewing system of the kind above referred to but in which certain improvements are introduced in all three phases of the system, namely, the tape itself, the equipment and method for producing the tape, and the brewing machine. Reference will thus be made to all of these phases of the system.

Various of the improvements effected by the present invention are related to and arise from the provision of a pod shaped differently from those used heretofore. Roughly speaking, the pods of the tape according to the present invention are of lady finger shape, having their major axis extended transverse to the length of the tape. Moreover, the pods employed according to the present invention are preferably arranged so that most, if not all, of the thickness or depth of the pod projects at one face of the tape strip, instead of the approximately equal projection at both faces of the tape, as is indicated in the prior patents above described.

By employing pods of the shape referred to, the pods themselves may be utilized as an indexing means for accurately positioning each pod in the brewing station of the brewing machine, thereby eliminating the necessity for employing indexing holes or other separate indexing means for positioning the pods in the brewing machine. In this way accuracy of positioning of the pods is assured.

The employment of pods of the shape contemplated by the invention is further of advantage because the pods utilize the available area of the tape more effectively than do round pods, and in consequence a greater number of pods will be accommodated in a given length of tape. Still further, it is possible in this way to package a greater number of pods in a carton of given volume.

Still another advantage of the arrangement of the invention is related to the equipment and method for producing the tape. Because of the closer spacing of the pods center-to-center lengthwise of the tape, with a tape producing machine it is possible to greatly increase the total number of pods produced without increasing the speed of feed of the tape material through the tape making machine.

How the foregoing objects and advantages are obtained will be clear from the following description referring to the accompanying drawings in which.

Figure 16:
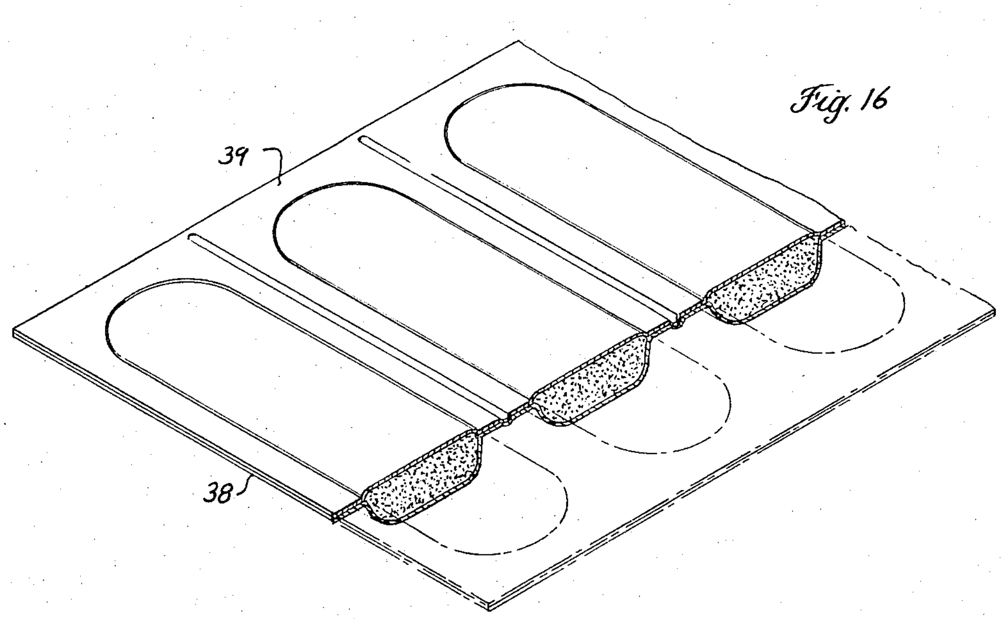
Figures 17, 20:
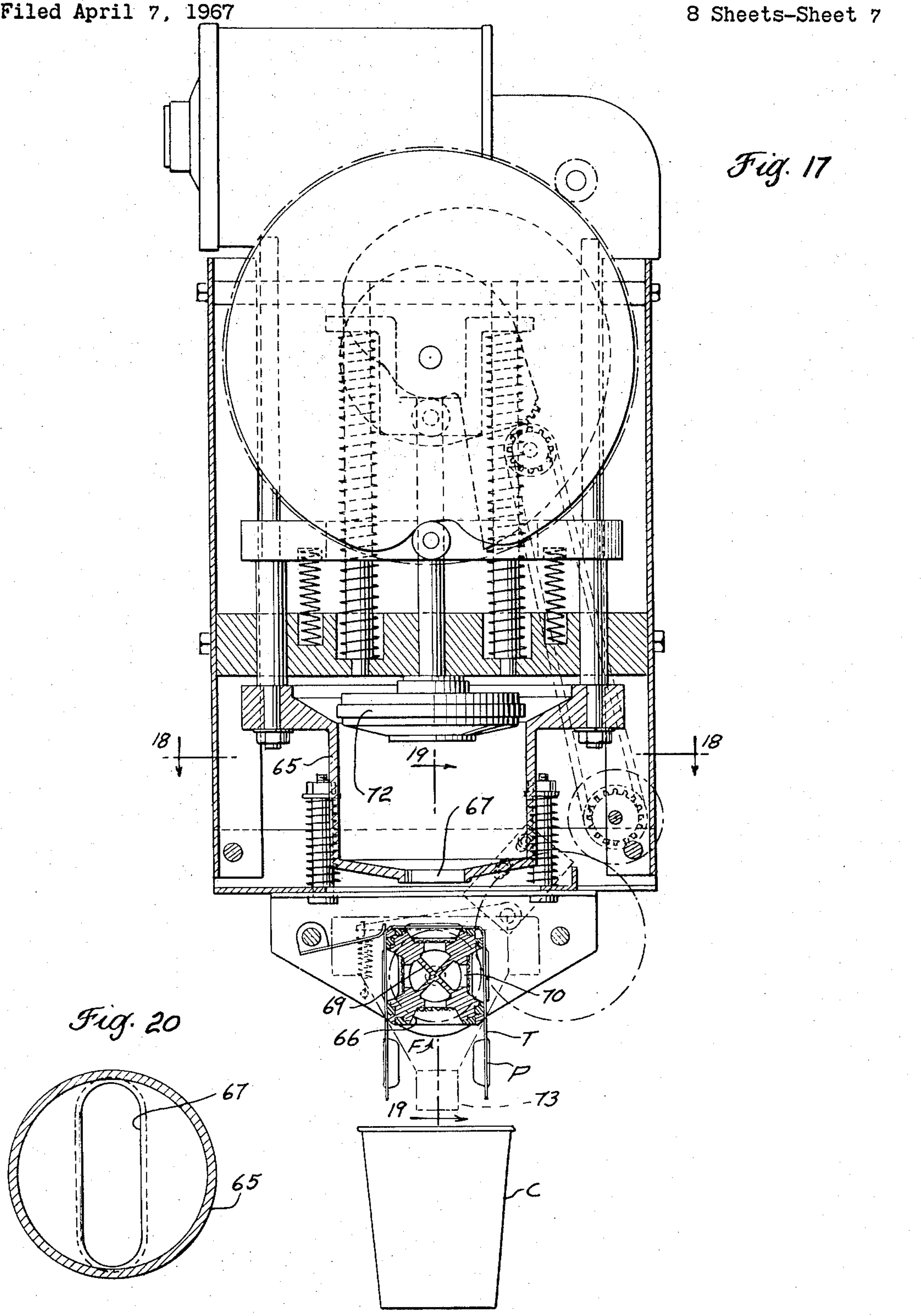
Figures 18, 19:
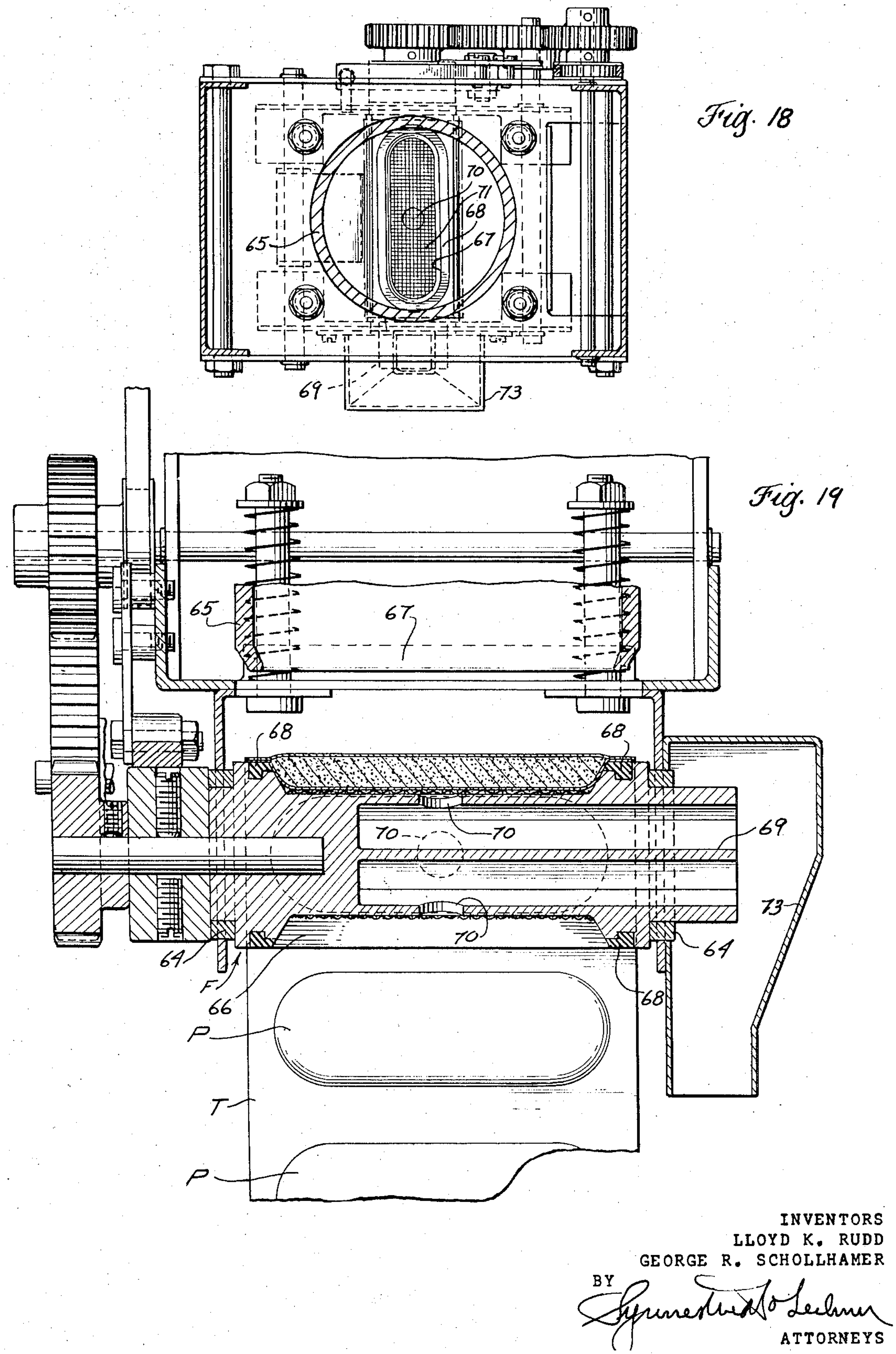

FIGS. 12 through 15 inclusive are fragmentary views of certain parts of the pod forming devices, this series of views illustrating a sequence of operations to be described;

FIG. 16 is an isometric view of a portion of a beverage tape conforming with the present invention, part of the tape being shown in phantom illustration and the pods being shown in section in a plane extended longitudinally of the tape intermediate the edges thereof;

FIG. 17 is a vertical sectional view through a brewing machine which, in accordance with the invention is adapted to use the kind of tape produced by the equipment of FIGS. 1 to 15 inclusive, which tape is illustrated in FIG. 16;

FIG. 18 is a horizontal sectional view of parts of the brewing machine taken as indicated by the section lines 18—18 on FIG. 17;

FIG. 19 is a fragmentary vertical sectional view of portions of the equipment of FIG. 17, taken as indicated by the section line 19—19 on FIG. 17, FIG. 19 being on and enlarged scale; and FIG. 20 is a plan sectional view of the brewing cylinder of the brewing machine of FIGS. 17 to 19.

In considering the equipment shown in FIGS. 1 to 15 inclusive, it is first noted that the machine there-shown is for the purpose of producing beverage tapes of the kind contemplated for use by the invention. This machine is of the general kind disclosed in the Clauss patent above identified, being made up of a base structure indicated generally at A and a vertically reciprocable press head indicated at B, the press head being guided by means of guideposts 21 and being raised and lowered by the eccentric 22 cooperating with the eccentric rod 23 which is pivotally connected with the press head B at 24.

Figure 5:
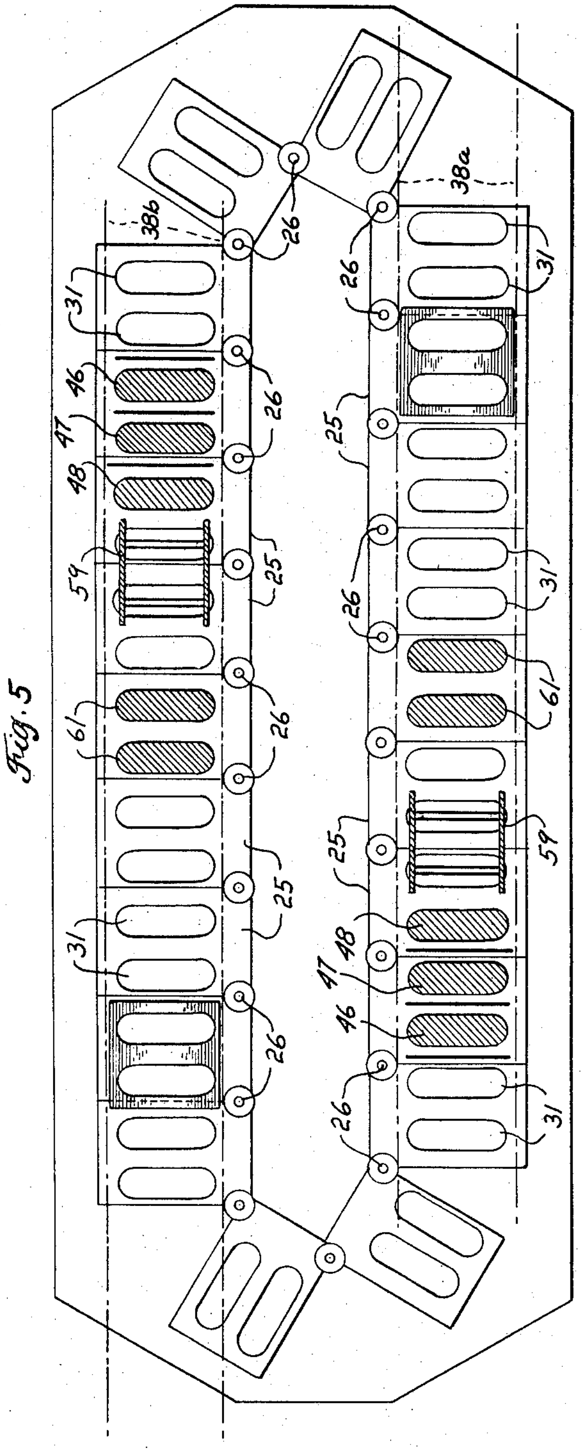
FIG. 5 is a somewhat diagrammatic plan view of the pod forming plates of the tape making machine, illustrating the complete circuit of travel of those plates and the location of certain of the operating and forming devices associated therewith.
Figures 6, 7, 8, 9, 10, 11:
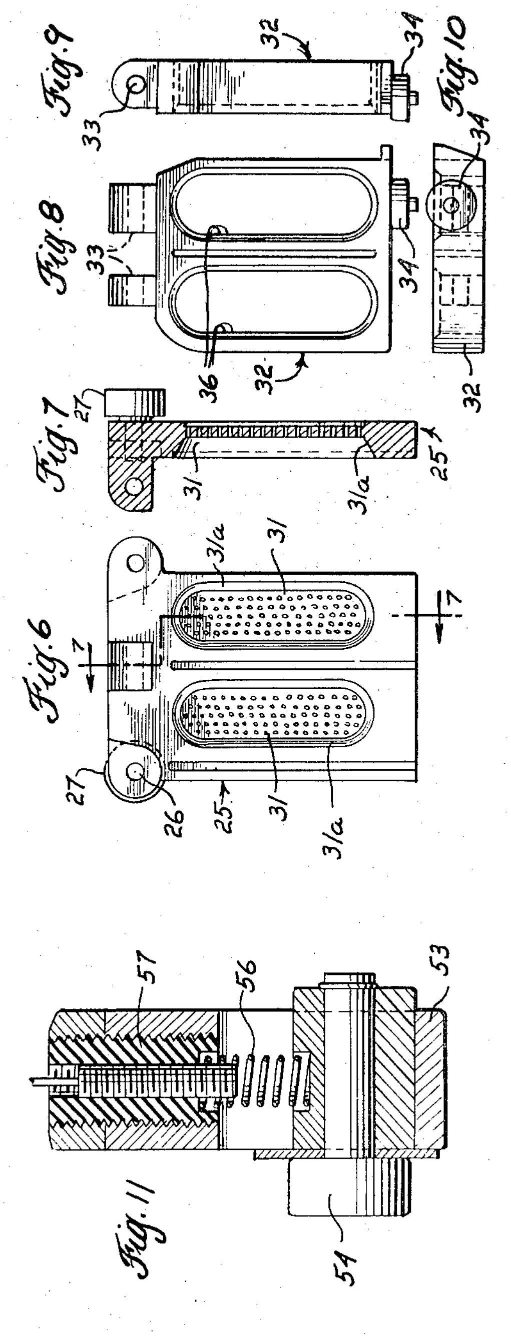
FIG. 6 is a further enlarged plan view of one of the forming plates, having a pair of pod forming recesses therein.
FIG. 7 is a sectional view taken as indicated by the line 7—7 on FIG. 6.
FIG. 8 is a plan view of a plate lid or retainer, incorporating a pair of retainer rings adapted to cooperate with the pair of pod forming recesses of one of the forming plates.
FIGS. 9 and 10 are side and end view respectively of the retainer ring device of FIG. 8.
FIG. 11 is a sectional view of certain details taken as indicated by the section line 11—11 on FIG. 3, FIG. 11 being on an enlarged scale.

The base or bed structure A serves to mount a series of forming plates 25 which appear in various of the figures, the entire series being shown in FIG. 5, and the individual plates being illustrated in some detail in FIGS. 6 and 7. The pivots 26 which interconnect the forming plates also serve to mount rollers 27 which are positioned to travel in a guide groove adapted to established a closed circuit of travel having two straight runs, and curved runs interconnecting the straight runs at the ends thereof as clearly appears in FIG. 5.

Figure 1:
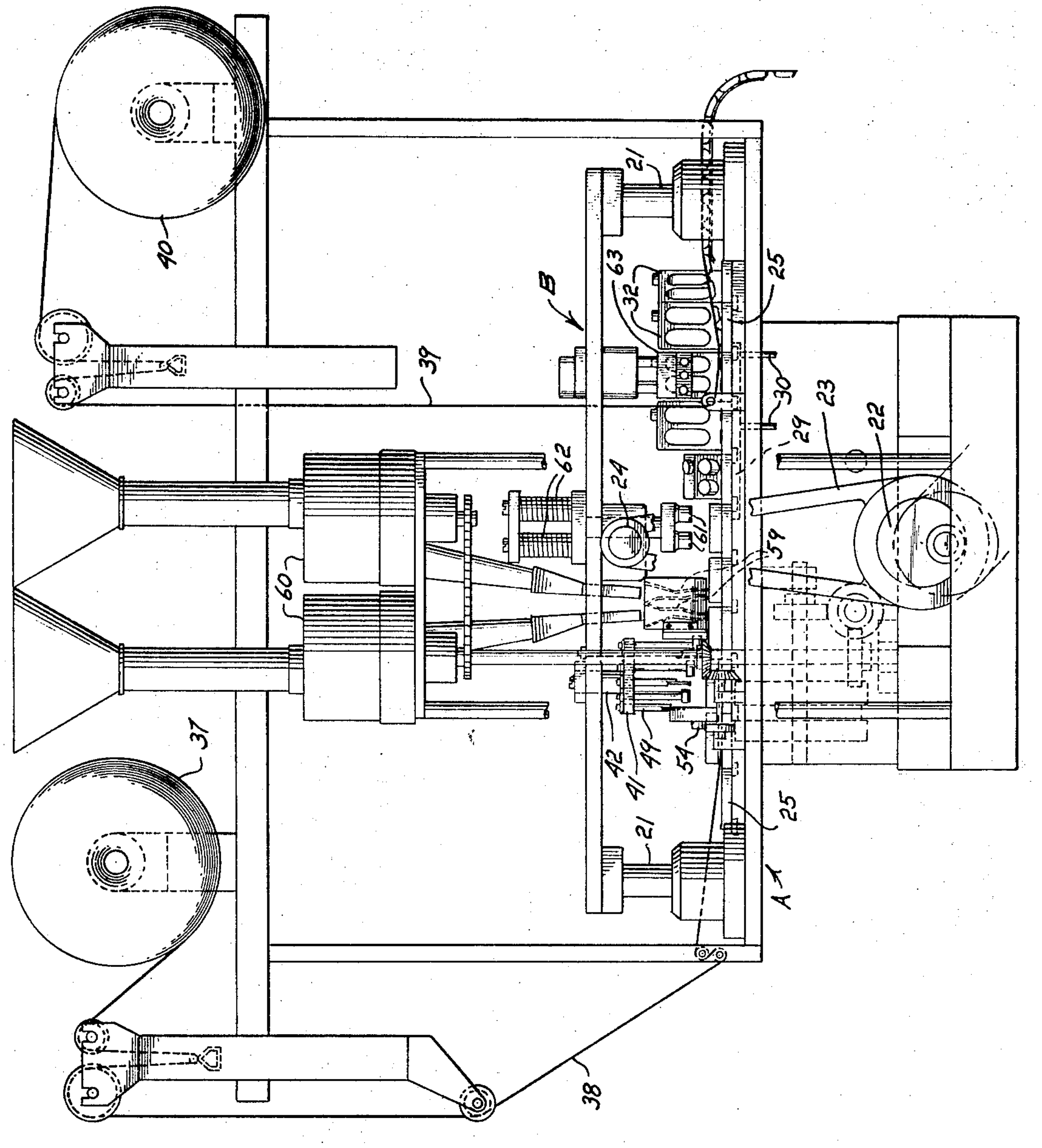
FIG. 1 is a side elevational view of a machine according to the invention for making beverage tape of the kind referred to above.
Figure 3:
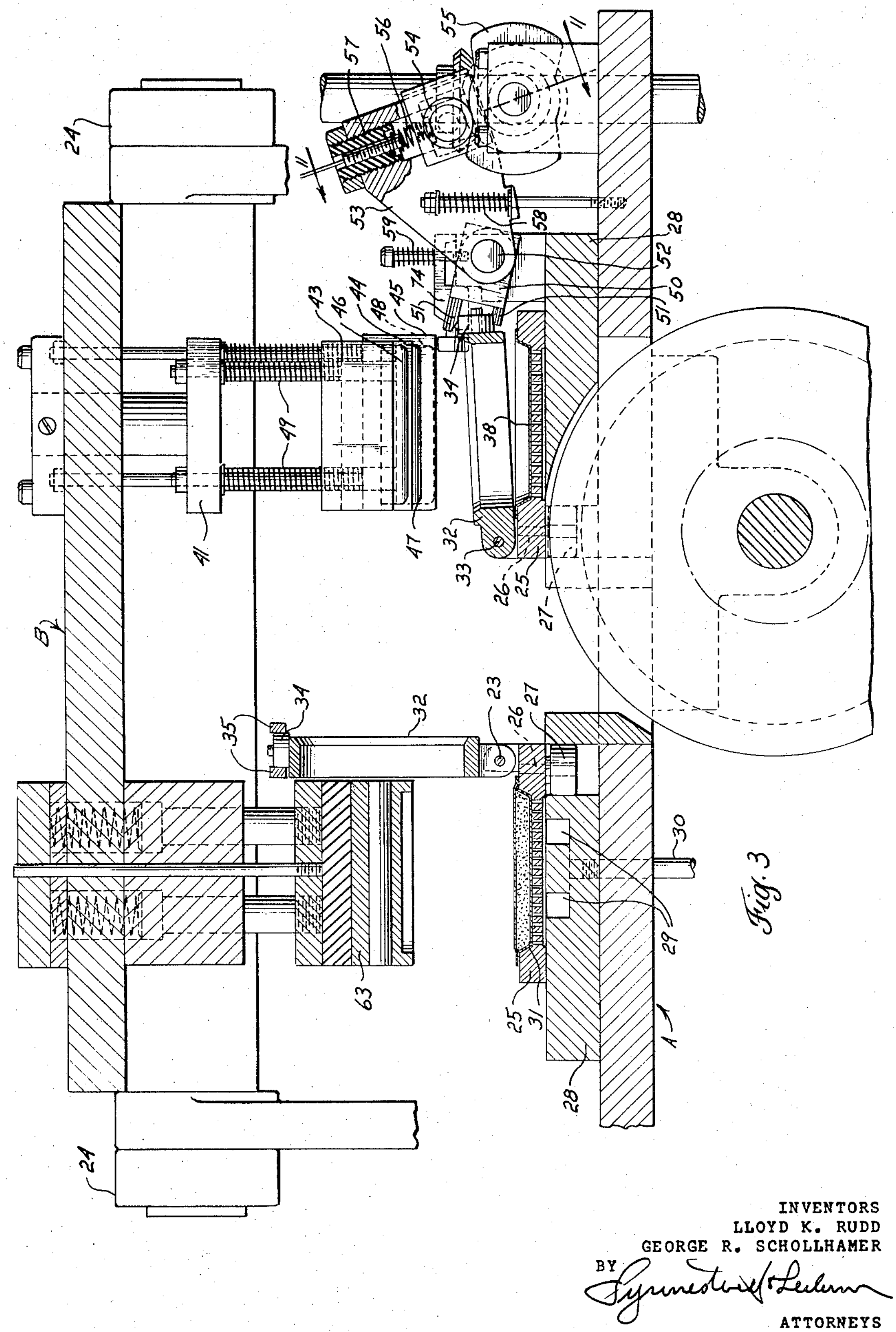
FIG. 3 is a transverse vertical sectional view taken substantially as indicated by the section line 3—3 on FIG. 2.

As best seen in FIG. 3, the forming plates 25 rest upon supporting blocks 28 which are mounted upon the base A, and in a portion of each straight run of the circuit of travel the blocks 28 are provided with grooves 29 with which vacuum connections such as indicated at 30 in FIG. 1 are associated, so that the lower side of the forming plates is subjected to reduced pressure in certain regions of the circuit of travel, for a reason which will be explained hereinafter.

Each forming plate 25 (see particularly FIGS. 3, 4, 6 and 7) is provided with a pair of recesses 31 which, when viewed in plan, are generally of lady finger shape, i.e., are elongated with straight side edges and curved ends, the orientation of these recesses being such as to position the major axis of each recess transversely of the path of movement of the forming plates in the circuit, as clearly appears in FIG. 5. The side walls of each recess are also tapered as indicated at 31*a* as shown in FIG. 6 for a reason to be explained and the bottom wall of each recess is perforated so as to provide communication between the recesses and the vacuum channels 29 during those portions of the straight runs of the circuit of travel where vacuum is applied to the underside of the forming plates.

The forming plates 25 are adapted to be intermittently driven so that they are advanced throughout the circuit of travel by steps or increments equal to the center-to-center spacing of the plates. The details of the mechanism providing for this intermittent advancement of the forming plates need not be considered herein as they form no part of the present invention per se, but for further information regarding a mechanism of this kind reference may be made to the Clauss patent above identified.

The press head B serves to carry various instrumentalities which cooperate with the recesses in the forming plates upon reciprocation of the press head in order to form pods in tape strips fed to the apparatus and in order to charge the pods, seal the pods and perform all of the necessary operations required to produce a beverage tape or cartridge incorporating a multiplicity of pods spaced from each other along the length of the tape. However, before considering the individual devices for shaping and charging the pods, attention is directed to the fact that each forming plate 25 is provided with a plate lid or double retainer ring device 32, the detail of which appears in FIGS. 8, 9 and 10, and the mounting of which on the forming plates appears in FIGS. 2, 3 and 4. The device 32 is pivoted to the plate 25 by means of the pivot 33 which cooperates with suitable apertured lugs formed on both the plate 25 and on the device 32 (see particularly FIG. 3). This pivotal mounting provides for swinging movement of the device 32 with reference to the forming plate 25, between a position where the device 32 rests upon the upper surface of the plate 25 (see FIGS. 2 and 12 to 15), and a position in which the device 32 is swung upwardly to a vertical position (see FIG. 3). For the purpose of pivotally moving the device 32, each such device is provided with a roller 34 adapted to ride between cam track elements 35–35. These cam track elements are arranged in the general manner disclosed in the Clauss patent above identified and provide for raising and lowering of the retainer rings during certain stages of the operation, as will be explained. Each retainer ring device 32 is provided with a pair of apertures generally of the same size and shape as the pod forming recesses 31 of the forming plates 25 and the apertures 36 are positioned so as to register with the pair of recesses 31 in the forming plate, when the retainer devices are brought down against the top surface of the forming plates.

Attention is now directed to the arrangement provided for tape strip feed to the apparatus of FIGS. 1 to 15. As seen in FIG. 1, a strip supply 37 delivers a tape strip 38 through a suitable feed mechanism into a position overlying the forming plates along one of the straight runs thereof, for instance, as indicated by the dot and dash lines 38*a* in FIG. 5. After certain tape forming operations are effected, a second tape strip 39 is brought in from a supply 40 and laid upon the first tape strip, as is clearly seen in FIG. 1. These two tape strips (38 and 39) are utilized to make up a complete beverage tape. Although not illustrated in the drawings, it is to be understood that additional supplies of other tape strips are fed to the tape forming plates 25 in the other of the two straight runs of the circuit, as is indicated at 38*b* in FIG. 5, and these additional tape strips are utilized to make up a separate complete beverage tape, so that the machine simultaneously produces two such tapes, one in each of the two straight runs of the forming plates.

Figure 2:
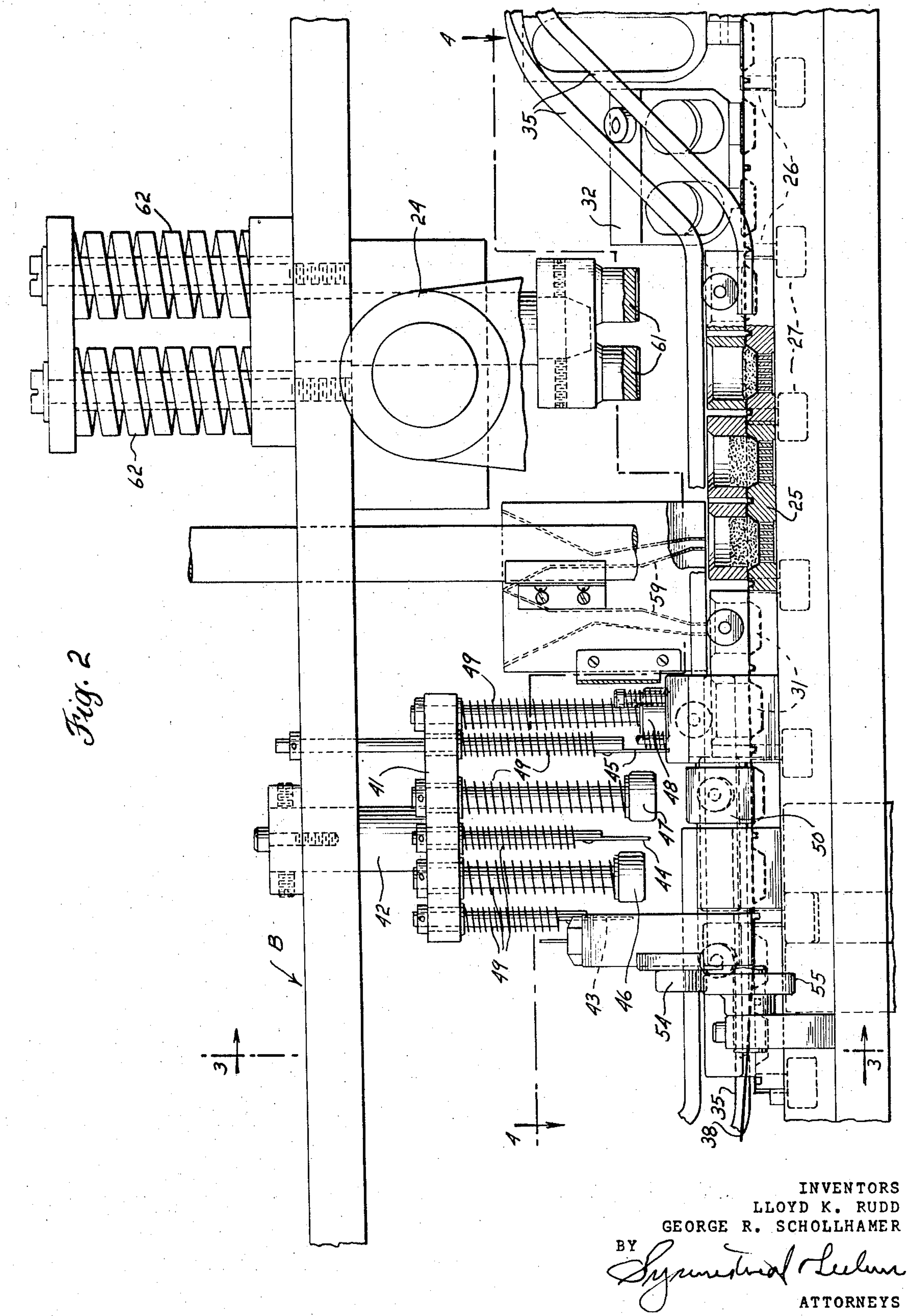
FIG. 2 is an enlarged elevational view of certain portions of the equipment shown in FIG. 1, with some parts shown in vertical section.

Turning now to the operating devices which are carried by the reciprocating press head B, attention is first directed to FIG. 2, from which it will be seen that a plate 41 is mounted on the head B by means of a support 42 so that it reciprocates with head B. The plate 41 serves to carry a series of tape gripping blades 43, 44 and 45 which are interleaved with plungers 46, 47 and 48. The mounting shaft of each of the elements 43 to 48 inclusive projects and is movable through the reciprocating supporting plate 41, and each of the elements is urged downwardly by means of a compression spring, all of these springs being designated by the numeral 49.

Figures 12, 13, 14, 15:
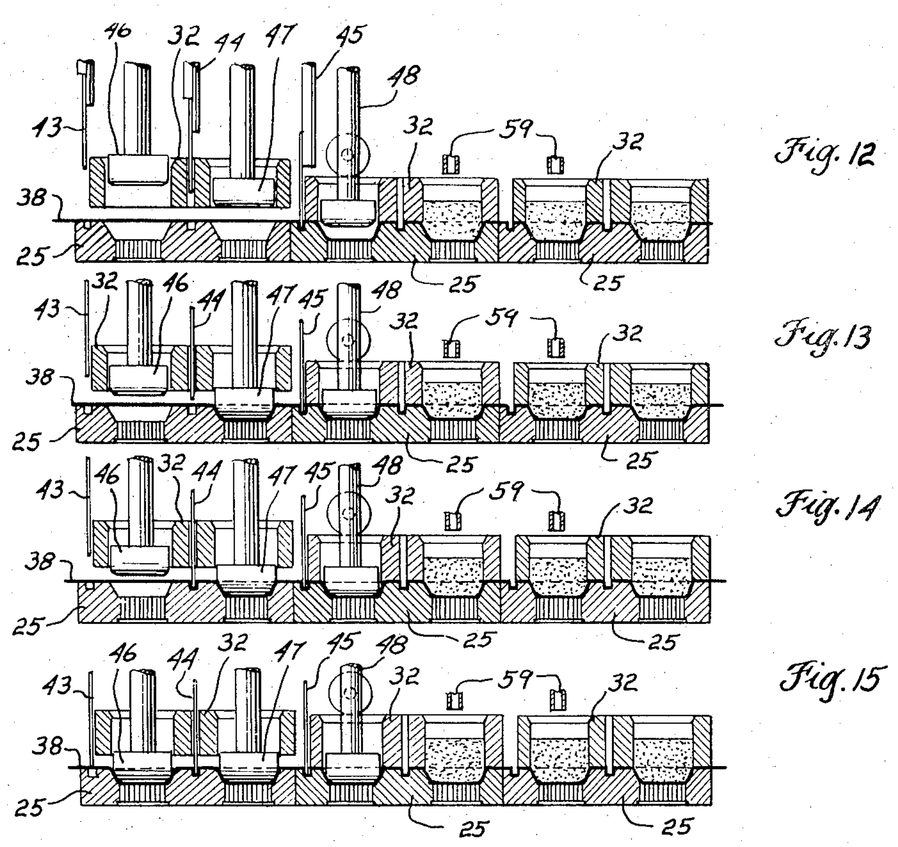

Plungers 46 and 47 comprise dimpling plungers and these plungers are shaped in general in accordance with the lady finger shape of the recesses in the forming plates (see FIGS. 2 and 3). When the dimpling plungers descend, they deflect or form the tape strip into the recesses of the forming plates, and thereby start the formation of the pods which are subsequently to be charged with granular or powdered beverage material. From FIGS. 2 and 12 to 15 it will be seen that the dimpling plunger 47 comprises the first of the elements mounted on the plate 41 to engage the tape strip and form a pod, this action being illustrated in FIG. 13. Further downward movement of the press head B and of the mounting plate 41 for the elements 43 to 48 brings the gripping blade 44 into engagement with the tape strip 38 in the region of a groove provided in the forming plate 25 between the two pod forming recesses therein, as is illustrated in FIG. 14. Further downward movement results in a dimpling operation by means of the plunger 46 which deflects the tape strip into the other of the two recesses in the forming plate 25, as is shown in FIG. 15.

The dimpling operations of the plungers 47 and 46 are thus effected sequentially, the plunger 47 being the first to operate, and its operation being followed by that of the plunger 46. This arrangement and sequence of operations permits tape strip 38 to be drawn from the supply 37 during the dimpling operation of the plunger 47 (see FIG. 13). The operation of the gripping blade 44 (FIG. 14) prevents drawing of tape strip from beneath the plunger 47 when the next dimpling operation is performed, which is effected by the plunger 46 and during the dimpling operation of plunger 46, tape strip may again be drawn into the pod being formed from the supply.

The supporting plate 41 also carries a third plunger 48 which is the first element to engage the tape strip on the forming plates in the downward movement of the press head B. This plunger 48 like plungers 46 and 47 is of lady finger pod shape and enters the previously formed pod, serving to retain the tape strip in its pod form within the recess of the forming plate 25, during the dimpling operations which are being performed on the following areas on the tape strip. The gripping blade 45 also engages the tape strip just behind the plunger 48 and assists in maintaining the integrity of the pod which at that time is engaged by the plunger 48.

During the dimpling operations described above the retainer ring devices 32 are swung downwardly to positions adjacent to the forming plates 25, but these retainer devices are held in a slightly raised position in the immediate vicinity of the dimpling plungers, so as not to tightly grip the tape grip in the areas immediately surrounding each of the pod forming recesses. This permits the tape strip to stretch in those areas during the dimpling operation. This slightly raised position of the retainer ring device is shown toward the right hand side of FIG. 3 and the mechanism for holding the retainer devices in that position is also there-shown. This mechanism includes a device 50 having projecting guide tracks 51 which cooperate with rollers 34 to lift the retainer rings 32. The device 50 is mounted on shaft 52, the position of which is controlled by an arm 53 carrying a cam follower 54 riding on a cam 55 which is operated synchronously with the intermittent drive for the forming plates 25. In this way, when each forming plate with its retainer ring reaches the dimpling position the cam 55 serves to lift the retainer ring as shown toward the right of FIG. 3, and after the dimpling operation the cam 55 lowers the retainer ring and the device 50 assumes a position appropriate to receiving the roller 34 of the next following retainer ring.

The cam follower 54 is mounted for movement with respect to the arm 53 against the action of compression spring 56, the pressure of which may be adjusted by means of the threaded ferrule 57. A compression spring 58 acting on the arm 53 serves to retain the cam follower 54 in engagement with the cam 55.

The mechanism for slightly lifting the retainer ring at the dimpling station is provided in order to prevent tearing of the tape strip in consequence of the action of the dimpling plungers, which necessarily require the tape strip to stretch in forming the pods. Moreover, the gripping blades 43, 44 and 45 all cooperate with grooves formed in the forming plates between the pod forming recesses, and these blades therefore tend to crimp the tape strip at the time of the dimpling operation, thereby drawing in additional tape strip from the source of supply, each crimp of tape strip representing a local "reservoir," so to speak, which may be drawn upon in the formation of the pod immediately following the crimped zone.

Figure 4:
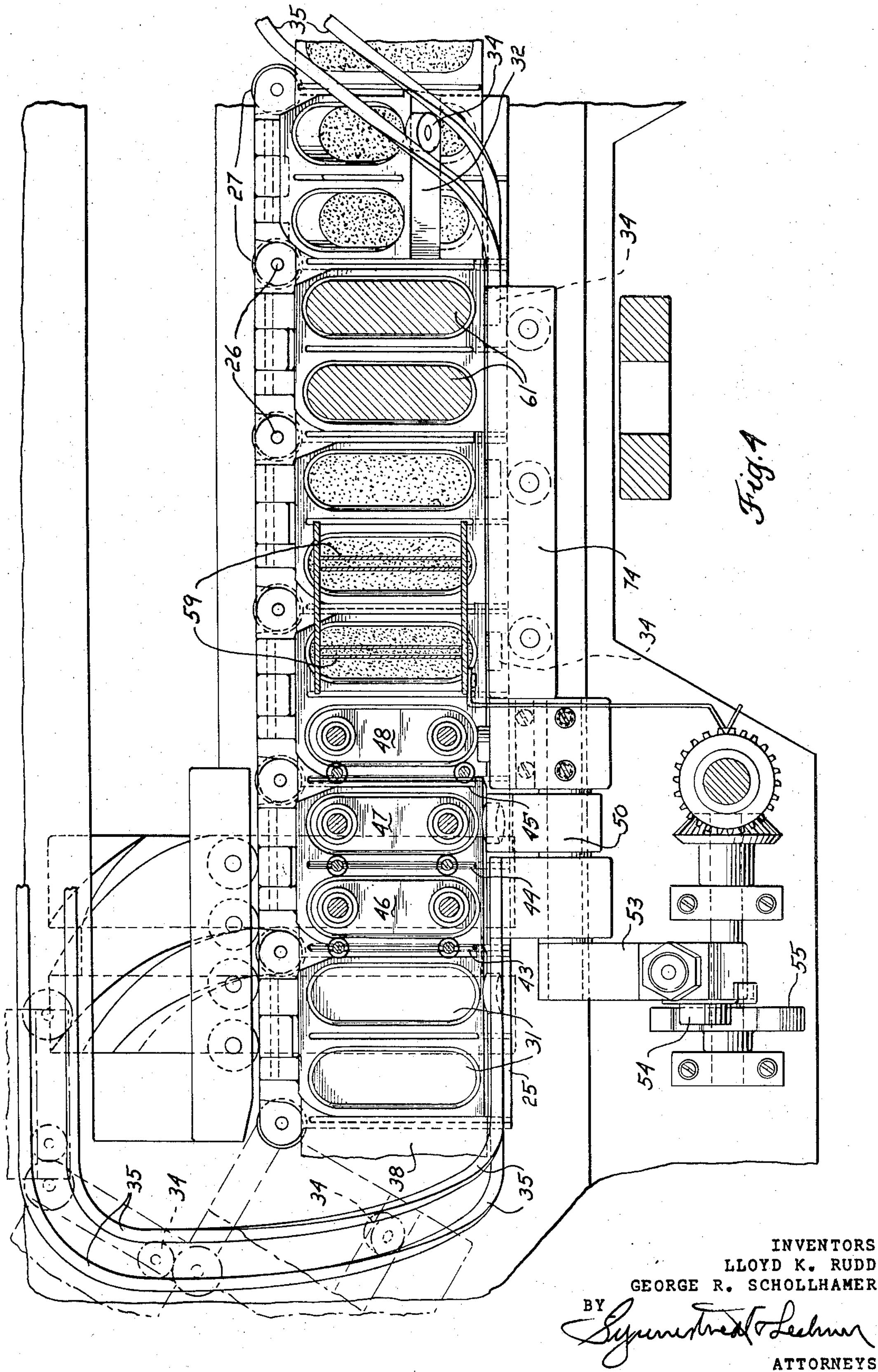
FIG. 4 is a plan sectional view taken substantially as indicated by the section line 4—4 on FIG. 2.

After the dimpling operations are completed, the retainer devices 32 are again dropped down on the forming plates and the rollers 34 then ride under a guide 74 which is spring pressed downwardly by a spring 59, so as to hold the retainer rings tightly against the forming plates, this being desirable in the following region where the formed pods are charged with beverage material and the charges are compacted or briquetted. Referring to FIGS. 1, 2 and 4, it will be seen that a pair of beverage feed chutes 59, supplied with measured quantities of beverage material from measuring devices 60, deliver the powdered or granular material into two of the previously formed pods. The delivery chutes 59 have a cross section which is elongated transversely of the beverage tape being formed, in order to distribute the powdered material through the length of the individual lady finger pods being loaded.

At a subsequent station a pair of briquetting devices 61 are spring mounted upon the press head B by means of springs 62. Upon downward movement of head B, the briquetting devices descend to engage the charge of powdered material previously loaded into the pods and to compress that material and, in effect, form briquettes thereof. Following the briquetting operation, the cam tracks 35 lift the rollers 34, and thus the retainer rings, substantially to the position shown at the left of FIG. 3, and immediately thereafter the second tape strip 39 is brought in and laid upon the first tape strip which now contains the briquetted pods. At a station subsequent to the positioning of the second tape strip (see FIG. 1) a sealing device 63 carried by the press head B is brought down upon the two tape strips surrounding each pod in order to heat seal the strips to each other in known manner and thereby complete the formation of the beverage tape.

It will be understood that all of these operations which have been described above including dimpling, crimping, beverage feed, briquetting, and heat sealing are effected separately in each of the straight runs of the forming devices at the two sides of the machine. The forming plate 25 and the dimpling mechanisms shown toward the right of FIG. 3 are parts located in one of the straight runs, whereas the parts shown toward the left of FIG. 3 are parts located in the other of the straight runs.

With the tape making equipment arranged in accordance with the foregoing, two pods instead of one pod are formed with each reciprocation of head B and the output of the equipment is therefore doubled, as compared with an arrangement in which only a single pod is made on each forming plate and at each intermittent advance of the plates in their circuit.

The shape of the pods produced clearly appears in FIG. 16, from which it will be seen that the tape strips 38 and 39 are sealed around pods of lady finger shape, each pod having a cross sectional shape when viewed in a plane perpendicular to the tape and extending lengthwise thereof which is of substantially uniform thickness throughout most of the area of the pod, but has inclined surfaces along the edges which, as will be shown below, is of advantage in connection with the use of the tape in a beverage brewing machine. It will be understood that, as is known in this art, the tape strips preferably comprise water permeable paper strips, so that the beverage itself may be prepared by passing water through the pod from one face of the beverage tape to the other.

Turning now to the brewing equipment shown in FIGS. 17 to 20, attention is first directed to the fact that this brewing equipment is generally similar in its overall arrangement to the brewing equipment shown in Heier Pat. No. 3,213,777 issued Oct. 26, 1965.

Various details of the brewing apparatus will therefore not be considered herein, particularly as they form no part of the present invention per se.

However, the brewing apparatus of FIGS. 17 to 20 includes differently shaped and differently constructed mechanism for feeding the beverage tape through the brewer and for forming the brewing chamber itself. As shown in FIG. 17, a rotative multi-sided feed device generally indicated at F is employed. This device (see also FIGS. 18 and 19) is rotatively mounted by bearings 64 on a horizontal axis below the cylinder 65.

The rotative device F, in the embodiment illustrated, has four sides, each of which has a recess or cavity 66 therein, this cavity being substantially of the shape of the lady finger pods of the beverage tape. The tape is indicated in FIGS. 17 and 19 at T and pods thereof at P and from inspection of the figures it will be seen that the center-to-center spacing of the cavities 66 of the device F measured around the perimeter of the device F is equal to the center-to-center spacing of the pods P on the tape. Therefore, with the tape feed guided as indicated in FIG. 17, a pod P enters a recess in one of the vertical sides of the device F and remains in that recess during the stepwise rotation of the device F through the top position or station, in which the brewing occurs, and then through the opposite vertical position, from which the spent tape is thereafter led away from the brewing apparatus itself.

At the bottom of the cylinder 65 a lady finger shaped port 67 is provided, as appears most clearly in FIG. 20. The cylinder 65 is mounted for vertical movement so as to bring the sealing surfaces around the port 67 downwardly into engagement with the resilient sealing ring 68 which completely surrounds each pod receiving recess of the feed device F, when a fresh pod P is positioned at the top position of feed device F.

The feed device F further is provided with internal partitioning 69, dividing the interior into four channels all of which are open at one end of the device F (toward the right of FIG. 19) and each of which is provided with a port 70 communicating with the bottom of one of the pod receiving recesses. A screen 71 is positioned in the bottom of the recess and serves as a support for the pod therein during the brewing operation.

Piston 72 (see FIG. 17) is adapted to force hot water from the cylinder 65 downwardly through the discharge port 67 and through a pod carried by the device F, the beverage then flowing through port 70 into one of the interior channels of the device F and ultimately out of that channel for delivery to a point of use, for instance, through a spout 73 under which a cup C may be placed.

The operation of the piston 72 occurs only at the time when the cylinder is brought down into engagement with the device F at which time the sealing surface around the port 67 seals the paper surrounding one of the pods against the rubber sealing ring 68 in order to completely close the brewing chamber during the brewing operation.

The details of the manner of operation, for instance, supply of hot water and the vertical movement of the cylinder and of the piston need not be considered herein as they conform with the disclosure of the Heier patent above identified. The feed device F is operated through suitable mechanism to advance the tape step by step, each step of advancement bringing another pod to the top position.

It is important to note in connection with the foregoing that the pods project in major part from only one face of the beverage tape. This projection facilitates the use of the pods themselves in accurately positioning or indexing the tape with relation to the device F. This accurate indexing is further enhanced by virtue of the inclined side edges provided on the pods and also at the edges of the recesses in the device F. These inclined edges have a self-centering action in the general manner of the teeth of a chain engaging between the teeth of a sprocket.

The lady finger shape of the pods thus not only results in increase in productive capacity of a given machine for producing beverage tape, but also makes possible the use of the pods themselves as an indexing means, thereby eliminating the necessity for special indexing arrangements, such as tape perforations and indexing pins as employed in certain prior known systems of this general kind.

We claim:

1. In a beverage tape of the type comprising a pair of water permeable strips having a plurality of pods of beverage material encapsulated therebetween, one of said strips having a plurality of cavities for receiving said pods of beverage material, said cavities being interconnected by substantially flat web portions defining a plane, the improvement comprising the other strip being substantially planar and being secured to said one strip, each of said pods being of elongated plan shape with its major axis extending transversely to the length of the strips and with the projecting portion thereof cross-sectionally shaped so as to present a substantially uniform depth of beverage material throughout the entire length of the pod, and substantially all of said beverage material being positioned in the cavities on one side of said plane defined by said webs.

2. In a beverage tape of the type comprising a pair of water permeable strips having a plurality of pods of beverage material encapsulated therebetween, one of said strips having a plurality of cavities for receiving said pods of beverage material, said cavities being interconnected by substantially flat web portions defining a plane, the improvement comprising the other strip being substantially planar and being secured to said one strip, each of said pods having a generally lady finger shape and said tape being imperforate, and substantially all of said beverage material being positioned in the cavities on one side of said plane defined by said webs.

3. In a beverage tape of the type comprising a pair of water permeable strips having a plurality of pods of beverage material encapsulated therebetween, one of said strips having a plurality of cavities for receiving said pods of beverage material, said cavities being interconnected by substantially flat web portions defining a plane, the improvement comprising the other strip being substantially planar and being secured to said one strip, each of said pods being of elongated plan shape with its major axis extending transversely to the length of the strips and with the projecting portion thereof cross-sectionally shaped so as to present a substantially uniform depth of beverage material throughout the entire length of the pod, the elongated edges of each pod being inclined toward each other in the direction of projection from the mean plane of said tape, each pod being so shaped to provide for sequential self-positioning of the pods in the brewing of successive batches of beverage in a brewing machine, each pod having a generally lady finger shape and said tape being imperforate, and substantially all of said beverage material being positioned in the cavities on one side of said plane defined by said webs.

4. A beverage tape comprising a pair of water permeable strips having a plurality of pods of beverage material encapsulated therebetween, each pod being of elongated plan shape with its major axis extending transversely to the length of the strips and with the projecting portion thereof cross-sectionally shaped so as to present a substantially uniform depth of beverage material throughout the entire length of the pod, each pod having a generally lady finger shape so that each pod requires a substantially smaller length of beverage tape than a circular pod having the same volume of beverage material and each of said pods project substantially entirely from the plane of one of said pair of strips in spaced relation lengthwise to said strip, whereby sequential self-positioning of the pods in the brewing of successive batches of beverage in a brewing machine may be achieved.

References Cited

UNITED STATES PATENTS

| | | | |
|---|---|---|---|
| 3,209,676 | 10/1965 | Zimmermann et al. | 99—77.1X |
| 3,213,777 | 10/1965 | Heier | 99—289 |
| 3,293,042 | 12/1966 | Eitzen | 99—77.1 |

A. LOUIS MONACELL, Primary Examiner

S. B. DAVIS, Assistant Examiner

U.S. Cl. X.R.

53—124, 184; 99—289